United States Patent [19]
Walles et al.

[11] Patent Number: 5,478,540
[45] Date of Patent: Dec. 26, 1995

[54] REMOVAL OF MERCURY HEAVY METAL VALUES EMPLOYING SULFUR TRIOXIDE

[76] Inventors: Wilhelm E. Walles, 6648 N. River Rd., Freeland, Mich. 48623; Luis C. Mulford, 800 Linwood Dr., Midland, Mich. 48640

[21] Appl. No.: 231,327

[22] Filed: Apr. 22, 1994

[51] Int. Cl.$^6$ ............................ C22B 43/00; C01G 13/00; C01B 17/96
[52] U.S. Cl. ............................ 423/99; 423/109; 423/544; 75/742
[58] Field of Search .................................. 423/106, 109, 423/544, 99, 566.1; 75/742; 588/236

[56] References Cited

U.S. PATENT DOCUMENTS

| | | | |
|---|---|---|---|
| 1,896,876 | 2/1933 | Wildman | 75/742 |
| 2,289,966 | 7/1942 | Herstein | 423/106 |
| 2,846,305 | 8/1958 | Ashley et al. | 75/742 |
| 3,932,149 | 1/1976 | Melkersson | 423/531 |
| 4,503,017 | 3/1985 | Gadd et al. | 423/87 |
| 4,902,493 | 2/1990 | Walles et al. | 423/522 |
| 5,013,358 | 5/1991 | Ball et al. | 75/742 |
| 5,244,492 | 9/1993 | Cyr | 75/742 |

FOREIGN PATENT DOCUMENTS

| | | | |
|---|---|---|---|
| 459054 | 8/1949 | Canada | 423/99 |
| 2102576 | 7/1971 | Germany | 423/1 |
| 49-49113 | 12/1974 | Japan | 423/99 |
| 53-108067 | 9/1978 | Japan | 423/544 |
| 54-51973 | 4/1979 | Japan | 423/566.1 |
| 552294 | 3/1977 | U.S.S.R. | 423/566.1 |

OTHER PUBLICATIONS

Translation of German patent 2,102,576, Jul. 1971.
"Ecolux 2000" Brochure, Ekoteho Oy, Pieksamaki, Finaldn, no date.
Hawley (Ed.) "The Condensed Chemical Dictionary," 10th Edition, New York, Van Nostrand Reinhold Company (1981), p. 740, no month.
California Environmental Protection Agency, Dept. of Toxic Substancea Control, Pollution Prevention, Public and Regulatory Assistance Program, "Lighting Wastes," Nov., 1992.
Freedman, *The Detroit News*, "Science panel recommends mercury safeguards," May 16, 1993, Metro.
Hansen & Fisher, *Environmental Science and Technology*, "Elemental Distribution in Coal Fly Ash Particles," 14(9):1111–7, Sep., 1980.
Henze, *The Midland Daily News*, "Mercury contamination concerns . . . ," Sep. 2, 1992.
Kulik, *World Wastes*, "Germany Faces Fluorescent Lamp Disposal Problem," ca. Jan., 1993, p. 10812.
Paulson, *The Ann Arbor News*, "Scientists: People need regulator mercury checks," May 13, 1993.
Product Report, *Chemical & Engineering News*, "Pigment producers anticipate heavy metal concerns," Oct. 12, 1992, ca. pp. 72–74.

Sundberg, *Recycling*, "Mercury recovery from mercurial waste," p. 85 et seq., no date.
United States Environmental Protection Agency, Waste Management Division, Region 1 (HER–CANG) Boston, Mass., "Report of National Technical Forum on Source Reduction of Heavy Metals in Municipal Solid Waste," EPA 901–93–001, Sep., 1993.
Walitsky & Bleasby, *Lighting Management & Maintenance*, "Classification and Disposal of Lamps Containing Mercury: Tackling the Issue," Aug., 1992, pp. 10–11.
Watson, *Resonance Recycling*, "Fluorescent lamps—a bright new recycle," Mar., 1992, ca. p. 70 to p. 78.
Windholz et al. (Eds.), *The Merck Index, Tenth Edition*, Merck & Co., Inc., Rahway, N.J., USA (1983) p. 841, no month.
Castellan, "Physical Chemistry," Second Edition, Addison–Wesley Publishing Company, Inc., Reading, Mass., 1971, p. 732, no month.
Cotton & Wilkinson, "Advanced Inorganic Chemistry," Third Edition, Interscience Publishers, New York, 1972, p. 504, no month.
Cotton & Wilkinson, "Basic Inorganic Chemistry," John Wiley & Sons, Inc., New York, 1976, p. 343, no month.
Dickerson, Gray & Haught, Jr., "Chemical Principles," W. A. Benjamin, Inc., New York, 1970, p. 197, no month.
Grant & Grant, "Grant & Hackh's Chemical Dictionary," Fifth Edition, McGraw–Hill Book Company, New York, 1987, no month, pp. 277 & 398.
Hawley (Ed.), "The Condensed Chemical Dictionary," Tenth Edition, Van Nostrand Reinhold Company, New York, 1981, no month pp. 252, 657 & 659–660.
Samdani (Ed.), "Chementator," *Chemical Engineering*, Apr. 1995, p. 17.
Barrett, "Mercury 'scare' not over," Port Huron, Mich., *Times Herald*, Sun., Apr. 2, 1995, pp. 1A & 4A.
Barrett, "Mercury in our waterways makes eating fish a worry," Port Huron, Mich., *Times Herald*, Sun., Apr. 2, 1995, p. 4A.

*Primary Examiner*—Steven Bos
*Attorney, Agent, or Firm*—Christopher John Rudy

[57] ABSTRACT

Heavy metal values can be removed and separated from a substance having a suitable amount of the heavy metal values by contacting the substance with a fluid containing sulfur trioxide to prepare a corresponding heavy metal sulfate, which is followed by leaching the sulfate therefrom and separating the leached sulfate. For example, mercury metal, oxide or sulfide, or methyl mercury, such as can be found in used fluorescent lamps and household batteries, in industrial flue sands, fly ash, contaminated soils, etc., can be removed by contact of crushed lamps or batteries, samples of the flue sands, fly ash, or contaminated soils, etc., with a mixture of sulfur trioxide in air to form mercuric sulfate, which is leached with a suitable leaching agent such as water, aqueous hydrochloric acid, hot dilute sulfuric acid, or concentrated sodium chloride solution, and sequestered by use of an ion exchange resin or precipitated as sulfides for further isolation of mercury value.

20 Claims, No Drawings

REMOVAL OF MERCURY HEAVY METAL VALUES EMPLOYING SULFUR TRIOXIDE

FIELD OF THE INVENTION

The present invention concerns removal and separation of heavy metal values, especially from wastes or contaminated substances, employing sulfur trioxide.

BACKGROUND TO THE INVENTION

More than 500 million fluorescent lamps are produced and discarded every year in the United States alone, in Germany, some 90 million. Worldwide, the total number of fluorescent lamps themselves produced and discarded is estimated to be over a billion. A typical four-foot (1.2-m) fluorescent lamp may be made to contain about from 150 to 450 mg of mercury. In addition, a staggering amount of household batteries are produced and discarded, several billion yearly in the U.S. alone. Such products contain a wide variety of heavy metallic elements and compounds which end up in landfills. Leaching by rainwater slowly spreads heavy metallic leachates into groundwater, from which about half of the U.S. population obtains drinking water.

Of the heavy metals, mercury is especially undesirable in water because of its known toxicity, as evidenced by the advisories widely disseminated against eating fish caught in lakes, rivers, etc., due to mercury contamination. Mercury is also unique in being volatile as a metal, which is taken advantage of in fluorescent lamps. By-products of mercury in these lamps include mercury oxides, which are slowly leachable into groundwater. Because of their energy efficiency, fluorescent lamps are replacing other lights dramatically, thus increasing environmental concerns for the presence of mercury. Thus, laws declaring fluorescent lamps a hazardous waste are being enacted.

Mercury sulfides can form in soils under reducing or anaerobic conditions. In sludge, landfills, and in muck in lakes and rivers, mercury is chemically reduced by action of bacteria to methyl mercury. The latter is many times more volatile than mercury itself and engenders a much more rapid dissemination of mercury into the environment and biosphere.

Other dangerous heavy metals such as arsenic can also be reduced under anaerobic conditions to a hydride. Antimony behaves similarly. These hydrides can become problematical.

Cadmium is a carcinogen.

As well, huge, contaminated plant sites with sediment regions exist and in the U.S. are part of "Superfund" sites. Such sites, when contaminated with mercury, may be a result, for example, of chlor-alkali production plants which employed liquid mercury in their electrolytic processing. Wastewater and soil which originally had only mercury metal now has methyl mercury and various mercuric oxides as well.

Various procedures to remove metals such as mercury are known. However, these procedures are expensive to carry out and/or only partially effective, especially, for example, in removal and disposal of mercury values of fluorescent lamps.

One method of attempting to dispose of the "special waste" mercury of fluorescent lamps, practiced in Germany, employs a crushing step, followed by the addition of sulfur or zinc, which chemically bonds mercury vapor into mercuric sulfide and zinc alloy. The immobilization of the mercury is only partially effective.

Incinerators of household waste produce dust containing mercury.

Electrostatic dust precipitators do not collect mercury, but carbon filters can. By employing carbon filters, for example, one Berlin combustion/incineration facility meets emission standards for mercury. However, this method is expensive and is not of direct or wide applicability.

The German Osram process to dispose of mercury in fluorescent lamps entails removal of the aluminum ends of the lamps, blowing out the internal lamp powder (calcium chloro fluoro phosphate enriched with heavy metals including mercury) to provide "special waste" for subsequent disposal. The glass tubing is considered non-hazardous. However, this process does make a special hazardous waste, although of a much smaller volume than the original lamps.

The German MRT process entails removal of fluorescent lamp ends, blowing out the powder and heating of the powder to distill out metallic mercury. The glass tubing is considered non-hazardous. This process does not remove heavy metal values other than those found as metallic mercury, leaving behind mercuric oxides, and other heavy metal values.

The Herborn process, practiced in Germany and Austria, can employ a mobile apparatus. It entails shredding the fluorescent lamps, heating to distill out metallic mercury, and trapping of the mercury vapor in activated carbon. It also does not remove heavy metal values other than from metallic mercury, and it is expensive to carry out.

The aqua-control process, practiced by the Berlin Sanitation Department, entails crushing the fluorescent lamps and slurrying the crushed lamps in a sulfide solution to immobilize heavy metals as oxides and sulfides. A black sludge is obtained as "special waste" for further disposal. This process is also expensive and inefficient.

Thus, no known process is fully acceptable commercially.

Even so, the reduction of heavy metals in waste streams remains of great concern. See e.g., *Report of the National Technical Forum on Source Reduction of Heavy Metals in Municipal Solid Waste,* U.S. Environmental Protection Agency, EPA 901-R-93-001, September 1993; Hansen & Fisher, "Elemental Distribution in Coal Fly Ash Particles," *Environmental Science & Technology,* 14(9):1111–7, September 1980.

Among patent references, a Feb. 7, 1933 U.S. Pat. No. 1,896,876, to Wildman, discloses a process of recovering mercury by dissolution of a water insoluble mercuric sulfide by exposing the mercuric sulfide to an aqueous solution of sodium sulfide, which dissolves it as a double salt complex containing sodium and mercury. Next, after filtration, sulfur dioxide is passed into the solution, which decomposes the complex and again precipitates mercuric sulfide. Mercury can be thus separated from admixtures with other metals. This patent is aimed at recovering mercury from ores such as cinnabar but generally is not useful for other heavy metals. It is a "wet" method.

Ashley et al., U.S. Pat. No. 2,846,305 (Aug. 5, 1958), discloses a separation and recovery of mercury by treating sludges containing colloidal mercury and alumina with sulfuric acid generally of a 10–80 percent concentration. This dissolves the alumina selectively but does not convert mercury metal to mercury sulfate. It, too, is a "wet" method.

Ball et al., U.S. Pat. No. 5,013,358 (May 7, 1991), discloses a method for the recovery of mercury from mercury-containing material by using chlorine gas, which converts metallic mercury and water insoluble mercury salts, especially mercurous chloride (calomel), to mercuric chloride, as by an oxidation reaction, and thereby makes the mercury values soluble in water. Chlorine gas, however, has difficulties of its own, not the least of which concern its handling. It employs a chlorination method.

It would be desirable to provide a new way in which such metal values could be inexpensively and readily removed. A new way such as this would be most desirably useful to help remove heavy metal, e.g., Hg, values from fluorescent lamps.

SUMMARY OF THE INVENTION

Provided is a procedure for removal and separation of heavy metal values from a substance having a suitable amount of the heavy metal values comprising contacting the substance with a fluid containing sulfur trioxide to prepare a corresponding heavy metal sulfate, leaching the sulfate prepared therefrom, and separating the leached sulfate.

The invention is useful in reducing the amount of heavy metal values of a substance. It finds particular utility in removing toxic heavy metal values including mercury from waste stream products such as used fluorescent lamps and spent household batteries, from industrial flues, and from contaminated soils.

A hallmark of the invention is its employment of sulfur trioxide. In particular, sulfur trioxide in air can be employed. As well, aqueous leaching agents, and efficient sequestering and/or precipitating agents, can be employed. This provides for the inexpensive and ready removal and separation of heavy metal values.

By it, significant advances are accomplished and vexing problems are ameliorated if not fully solved in the art. As well, the procedure should be fully acceptable commercially.

Numerous further advantages attend the invention.

ILLUSTRATIVE DETAILED EMBODIMENTS OF THE INVENTION

The procedure hereof removes and separates heavy metal values from a substance having a suitable amount of the heavy metal values. The removal steps embrace contacting the substance with a fluid containing sulfur trioxide, to prepare a corresponding heavy metal sulfate, and leaching the sulfate. As a next step, the leached sulfate is separated. Additional steps may be carried out.

Herein, a procedure is a method and/or process.

As the substance from which is to be removed the heavy metal values by the practice of the invention, can be mentioned used fluorescent lamps, spent household and hearing aid batteries, mercury thermometers and household silent electrical switches, varnish and paint antifungal and pigment ingredients, amalgam dental fillings, industrial flue sands or fly ash, contaminated soils, and so forth and the like. A preferred substance for employment herein is fluorescent lamps.

Heavy metal values suitable for removal by the procedure of the invention generally include those of elements having atomic weights of about 50 and higher of such heavy metals as to include, for example, vanadium; chromium; manganese; iron; cobalt; copper; gallium; rubidium; strontium; yttrium; zirconium; cadmium; tin; antimony; cesium; barium; rare earth elements (lanthanides) to include lanthanum, cerium, neodymium, and europium; hafnium; tungsten; platinum; mercury; lead; bismuth; and actinide series metals to include actinium, uranium and plutonium. Preferably, in the practice of invention, the heavy metal values include one or more of such metals as Hg, Sb, Mn, W, Sn, Cu, Cd, Y, La, Ce and Er. Most preferably, the heavy metal values include Hg.

The heavy metal values may be in the form of the free metal or be in compound form such as with, for example, its salts, oxides and/or sulfides. Both free metal and compound forms can typically be made subject to the procedure hereof. For example, mercury metal and mercuric oxide or sulfide, and methyl mercury can represent heavy metal values herein. An alloy containing heavy metal(s) may be suitably employed, particularly when reduced in size to particles, say, of 1 mm and preferably less.

The substance may be acted upon physically to better expose its heavy metal values, or better prepare it, for contact in the procedure hereof. For example, fluorescent lamps, batteries and thermometers, etc., can be crushed or shredded, and samples of flue sands or contaminated soils, etc., can be dried, soils, for example, with heating to about 200 to 300 degrees C., as are preferred, prior to the required contact with the fluid containing the sulfur trioxide.

As a fluid to contain the sulfur trioxide can be generally mentioned, in gas, liquid and/or supercritical form, air, oxygen, nitrogen, argon, helium, carbon dioxide, and the like. Generally, these fluids are neutral or oxidizing towards the heavy metal values. Pure sulfur trioxide can be employed as fluid. Preferably, the fluid is a gas, including a gas such as air, nitrogen or oxygen, in which sulfur trioxide is homogeneously mixed. A preferred fluid is air, in which sulfur trioxide is present at about from 1 to 30 percent by weight.

Fluids containing sulfur trioxide can be conveniently generated, and their unreacted excess recycled, as described in U.S. Pat. Nos. 4,902,493 (Feb. 20, 1990) and 4,915,912 (Apr. 10, 1990) to Walles et al., incorporated herein by reference.

Equivalents of the sulfur trioxide are those sufficient to prepare the desired amount of heavy metal sulfate(s). In general, an excess equivalent amount of sulfur trioxide in proportion to the heavy metal value(s) sought to be removed is employed. Typically, an excess of sulfur trioxide, based on molar amounts, is about from slightly greater than 1:1 to 10:1 or more.

The required contact can be carried out at any suitable temperature. Temperatures about from −50 to +300, or 0 or 10 to 50, 100 or 200 degrees C. may be employed. Preferably, the temperature is about room temperature or slightly above, for example, about from 20 or 25 to 30 or 40 degrees C. However, as in the case of soil samples dried with heating, especially as would relate to the overhead dust or fines produced therefrom which often contain enriched amounts of heavy metal values, contact of the already heated sample with the fluid containing sulfur trioxide is advantageously carried out at the elevated temperature. Upper limits of the contact are generally those at which a heavy metal sulfate desired to be removed would decompose.

The required contact can be carried out at any suitable pressure. The pressure of the contact can include pressures about from 0.5 to 50 atmospheres, although ambient pressures, for example, about 1 atmosphere, can be advantageously and effectively employed. Time of the contact is that sufficient to convert heavy metal values to the desired degree of sulfate production. Times may be from about 1 second for the finest particles to several hours. A very short contact time, say, some several minutes or less, generally suffices with fluorescent lamps.

Contact may be enhanced by agitation of the substance from which is to be removed the heavy metal values. The agitation can be by stirring, for example, as with a paddle stirrer in a batch process, by shaking, by free fall, by fluidization as with a fluidized bed, and so forth.

Preferably, the contact of the fluid containing sulfur trioxide is made with a dry substance from which is to be removed the heavy metal values. Otherwise, sulfuric acid is produced undesirably.

Generally, heavy metal values cannot be oversulfonated.

Preparation of heavy metal sulfate may be considered to be from "sulfo-oxidation" and/or "sulfonation" reaction(s). For example, the following schema generally represent that which is proposed to occur to mercury values in reaction with sulfur trioxide at about room temperature:

Free mercury is generally sulfo-oxidized as follows:

$$Hg + 2\ SO_3 \rightarrow HgSO_4 + SO_2.$$

Mercuric oxides, and mercury bonded to calcium halo phosphate powder such as found with fluorescent lamps, simplified as HgO, are generally sulfonated as follows:

$$HgO + SO_3 \rightarrow HgSO_4.$$

Mercurous ion, should any exist, such as in mercurous oxide, generally reacts as follows:

$$Hg_2O + SO_3 \rightarrow 2\ HgSO_4 + SO_2.$$

Methyl mercury generally reacts as follows:

$$HgCH_3 + SO_3 \rightarrow HgSO_4 + \text{C-oxidation products} + SO_2 + H_2SO_4.$$

Mercuric sulfide generally reacts as follows:

$$HgS + 4\ SO_3 \rightarrow HgSO_4 + 4\ SO_2.$$

Thus prepared is readily leachable mercuric sulfate.

After the contact, recycle of the fluid, unreacted parts or reacted residues thereof and/or unreacted sulfur trioxide can be carried out.

Undesired by-products can be removed or converted into other products. For example, sulfur dioxide can be oxidatively burned to prepare sulfur trioxide, which can enter the procedure as a reactant; carbon oxidation products such as carbon monoxide can be oxidatively burned to produce carbon dioxide. Other removal or conversion processes or methods can be carried out.

The heavy metal sulfate is next leached from the remainder of the substance from whence it came. Temperature of the leaching step is that which suffices to leach or assists in leaching of the sulfate from the remaining original substance, for example, about from 0 or 10 to 50 or 100 degrees C. For example, with respect to mercuric sulfates a leaching agent can generally be water. It may be in the form of an aqueous acid such as aqueous hydrochloric acid or hot dilute sulfuric acid, or it can be in the form of a concentrated aqueous sodium chloride solution. Many other heavy metal sulfates can be leached with an aqueous leaching agent. Lead and barium sulfates, very poorly soluble in neutral water, however, may be better leached with aqueous ammonium salts or aqueous sulfuric acid. The leaching agent may be or contain an organic solvent in appropriate circumstances. Advantageously, the aqueous leaching agent may be made slightly acidic, with a pH below 3 to 4. Preferably, an aqueous leaching agent is employed.

After leaching, the heavy metal sulfate is separated. For example, this may be by sequestering, as by use of an ion exchange resin such as a sulfonated type as with sulfonated styrene divinyl benzene cation exchange resins, a carboxylated type, and so forth. This may be represented in the case of mercury by the following general formula:

$$\text{Resin}(-2) + Hg(+2) \rightarrow \text{Resin}-Hg.$$

Typically, the sequestered heavy metal ion bound to the ion exchange resin is released by contact of the resin with a salt solution eluent containing ions such as aqueous sodium, potassium, etc., ions with a suitable counterion which will pair with the released heavy metal ion to form a soluble ion pair in the eluate. This may be represented in the case of mercury and sodium by the following general formula:

$$\text{Resin}-Hg + 2\ Na(+) \rightarrow \text{Resin}-Na_2 + Hg(+2).$$

Alternatively or in addition, separating may be by simple collection of the leachate and/or evaporation. The heavy metal sulfate leachate may be placed in concrete. Further, a heavy metal sulfate may be separated by precipitation, as by reacting leached sulfate with hydrogen sulfide to prepare an insoluble sulfide which is separated from the leachate such as by centrifuging, filtering, scooping, decanting, and so forth. For example, mercury sulfate can be precipitated as represented by the following general formula:

$$HgSO_4 + H_2S \rightarrow HgS\ (s) + H_2SO_4.$$

Temperatures are any suitable. For example, the temperatures of separation may include temperatures about from 0 or 10 to 50 or 100 degrees C. Ambient or room temperature separations are advantageously carried out.

Regeneration of heavy metal may be carried out later.

Preferably, the procedure hereof, at least up to the stage where the substance having the heavy metal values is contacted with the fluid containing sulfur trioxide, is conducted in a closed system so as to avoid escape of volatiles to the atmosphere. Afterward, it becomes less necessary to enclose the procedure, although it may well be desirable to do so.

SPECIFIC EMBODIMENTS

The following examples and notes further illustrate the invention. Percentages are by weight.

EXAMPLE 1

Mercury Sulfo-oxidation

In order to demonstrate that sulfur trioxide containing gas is capable of at room temperature of sulfo-oxidizing mercury, a drop of liquid mercury is placed in a glass vessel. Next, from a sulfonator-recycler gas source (Walles et al., U.S. Pat. No. 4,902,493), a sample of 20 percent sulfur trioxide gas in air is passed over the mercury.

The shiny mercury reacts and becomes covered with a hazy skin of water-soluble mercuric sulfate.

EXAMPLE 2

Heavy Metal Removal from Fluorescent Lamps

Part 2A (Comparative): A 10-gram crushed fluorescent lamp sample (General Electric 48-inch (122-cm)) is slurried in water. Upon settling, 50 ml of 1 percent aqueous sodium sulfide is added. No precipitate is observed, demonstrating that mercury in the form of Hg(O) does not react with the water or sodium sulfide.

Part 2B: A 10-gram crushed fluorescent lamp sample as in Part 2A above is exposed in a glass jar to a sample of 22.8 percent sulfur trioxide gas in air for 10 minutes. Next, upon slurrying the resultant lamp sample in water and upon the addition of 1 percent aqueous sodium sulfide solution, a black precipitate forms. This shows, as in Example 1, reaction of mercury values with sulfur trioxide to form mercuric sulfate, which upon addition of the sodium sulfide produces the black, mercuric sulfide precipitate.

Part 2C: The work of Part 2B above is repeated with the exception that only a 2-minute exposure to the same gas mixture is employed. The same results are observed.

EXAMPLE 3

Level of Mercury Removal

Part 3A: A sample of 203.3 grams of crushed fluorescent lamps as in Example 2 is placed in a 750-ml reactor jar, and a sample of 6.2 grams of reactant liquid sulfur trioxide is added. This is followed by 30 minutes of shaking to provide a resulting sample containing heavy metal sulfates.

Part 3B: A sample of 1-liter of water (DI purified) is used in portions to extract all of the resulting sample from Part 3A above. A sample of the extract, upon addition of an aliquot of 1 percent aqueous sodium sulfide, shows the black precipitate of mercuric sulfide as in Example 2 (2B) above.

Part 3C: In order to simulate a test for residual toxicity, toxic heavy metals leachable by acidic rainwater (caused from atmospheric carbon dioxide and sulfur dioxide), a further extraction is carried out. The so-called TCLP (toxicity characteristic leaching procedure) utilizes dilute acetic acid to simulate long-term rainwater extraction. The solid residue of sulfo-oxidized and water-extracted crushed lamp sample is slurried in 1 liter of 5 percent aqueous acetic acid. To the extract is added 1 percent aqueous sodium sulfide. No black precipitate forms, indicating a lack of residual mercury in the lamps.

Part 3D: The residue of Part 3C is extracted again, now with still stronger acid, 1 liter of 1 percent aqueous sulfuric acid. Again, upon the addition of sodium sulfide, no black precipitate forms.

NOTES (EXAMPLES 1-3)

Although Example 1 clearly shows that the chemistry works, in fluorescent lamps a mercury gas plasma slowly diffuses into the "phosphor" particles and chemically reacts. Mercury plasma gas can then react with various oxides into complicated complex forms.

Examples 2 and 3 show that the lamps used (having 2000 hours of operation) did give up essentially all of their mercury values through the procedure of the invention.

EXAMPLE 4

Fly Ash

A sample of dry fly ash having heavy metal values is sufficiently contacted with a sample of 10 percent sulfur trioxide gas in air to convert the heavy metal values, to include as oxides and sulfides, into sulfates. The sulfates are leached with water or slightly acidic water, and are sequestered with a cation exchange resin.

CONCLUSION

The present invention is thus provided. Numerous adaptations and modifications can be effected within the spirit of the invention, the literal scope of which is particularly pointed out as follows:

We claim:

1. A procedure for removal and separation of mercury values from a substance containing mercury values comprising contacting the substance selected from the group consisting of a crushed or shredded fluorescent lamp, battery, thermometer, silent electrical switch, amalgam dental filling, a varnish or paint antifungal ingredient, flue sand, fly ash, and contaminated soil, wherein the mercury values are exposed, with a gas comprising sulfur trioxide to prepare a mercury sulfate, leaching the sulfate prepared therefrom, and separating the leached sulfate.

2. The procedure of claim 1, wherein the leaching is carried out with an aqueous leaching agent.

3. The procedure of claim 2, wherein the contacting of the substance is carried out at a temperature from about 10 degrees C. to about 200 degrees C., and the leaching is carried out at a temperature from about 10 degrees C. to about 100 degrees C.

4. The procedure of claim 2, wherein the substance is at least one crushed or shredded fluorescent lamp.

5. The procedure of claim 2, wherein the substance is at least one crushed or shredded household or hearing aid battery.

6. The procedure of claim 2, wherein the substance is contaminated soil, industrial flue sand or fly ash.

7. The procedure of claim 2, wherein the mercury sulfate is separated by employing an ion exchange resin by contacting mercury present in the aqueous leaching agent from the mercury sulfate leached thereinto with the ion exchange resin to sequester the mercury on the ion exchange resin.

8. The procedure of claim 2, wherein the mercury sulfate is separated by conversion to insoluble mercury sulfide by contact of mercury present in the aqueous leaching agent from the mercury sulfate leached thereinto with a source of sulfide to prepare the insoluble mercury sulfide.

9. A procedure for removal and separation of heavy metal values containing mercury values from fluorescent lamps comprising providing a sample of crushed or shredded fluorescent lamps, contacting the sample with a gas comprising sulfur trioxide to prepare a heavy metal sulfate containing mercury sulfate, leaching the heavy metal sulfate containing mercury sulfate prepared therefrom with an aqueous leaching agent, and separating the leached heavy metal sulfate containing mercury sulfate.

10. The procedure of claim 9, wherein the contacting of the sample is carried out at a temperature from about minus 50 degrees C. to about plus 300 degrees C.

11. The procedure of claim 10, wherein the gas comprising sulfur trioxide is a mixture of air and sulfur trioxide.

12. The procedure of claim 11, wherein the contacting of the sample is carried out at a temperature from about 0 degrees C. to about plus 200 degrees C.

13. The procedure of claim 11, wherein the contacting of the sample is carried out at a temperature from about plus 10 degrees C. to about plus 100 degrees C.

14. The procedure of claim 9, wherein the contacting of the sample is carried out at a temperature from about plus 10 degrees C. to about plus 50 degrees C.

15. The procedure of claim 14, wherein the gas comprising sulfur trioxide is a mixture of air and sulfur trioxide.

16. A procedure for removal and separation of mercury values from a substance containing mercury values comprising contacting the substance, wherein mercury values in a solid or liquid state are exposed, with a gas comprising sulfur trioxide to prepare a mercury sulfate, leaching the mercury sulfate prepared therefrom, and separating the leached mercury sulfate.

17. The procedure of claim 16, wherein the gas comprising sulfur trioxide is a mixture of air and sulfur trioxide.

18. The procedure of claim 17, wherein the leaching is carried out with an aqueous leaching agent.

19. The procedure of claim 16, wherein the contacting of the sample is carried out at a temperature from about 0 degrees C. to about 100 degrees C.

20. The procedure of claim 17, wherein the contacting of the sample is carried out at a temperature from about 10 degrees C. to to about 50 degrees C.

* * * * *